3,726,901
OIL-SOLUBLE DERIVATIVES OF NITRO-TETRA-ETHYLENEPENTAMINE POLYBUTANE AND TRIMELLITIC ANHYDRIDE

Richard J. Lee, Park Forest, Ill., assignor to Standard Oil Company, Chicago, Ill.
No Drawing. Filed Aug. 8, 1969, Ser. No. 848,732
Int. Cl. C07c 63/32
U.S. Cl. 260—346.3                                    1 Claim

ABSTRACT OF THE DISCLOSURE

Oil-soluble compounds are prepared by heating at reflux temperature a mixture of an alkane nitro-amine, containing at least about ten carbon atoms, and an organic polybasic aliphatic or aromatic acid, or the anhydride thereof; compounds so formed are useful additives in oleaginous compositions.

BACKGROUND OF THE INVENTION

Nitration of alkanes with nitrogen tetra-oxide under oxidizing conditions forms the corresponding nitro-nitrato alkanes. Reacting the nitro-nitrato alkanes with alkyl amines or alkylene polyamines forms the corresponding alkane nitro-amines. I have discovered that such alkane nitro-amines, which contain at least about ten carbon atoms, reacted with organic polybasic aliphatic or aromatic acids, or the anhydrides thereof, from alkane nitro-amine derivatives which are oil-soluble, and suitable as additives in oleaginous compositions to impart detergency and other desirable properties thereo.

SUMMARY OF THE INVENTION

In accordance with the present invention, useful oil-soluble derivatives of alkane nitro-amines, containing at least about ten carbon atoms, are obtained by reacting at reflux temperatures a mixture of such alkane nitro-amines and the desired organic polybasic aliphatic or aromatic acid, or the anhydride thereof, preferably in solution in a non-reactive organic polar solvent; from about 0.5 to about 1.0 mol of the alkane nitro-amine per mol of the acid or anhydride are used. After completion of the reaction the reaction product is recovered by distilling or stripping off the solvent, using a nitrogen purge if desired.

As noted above the alkane nitro-amine reactant of this invention is obtained by treating a nitro-nitrato alkane with an alkyl amine or with an alkylene polyamine.

(a) Preparation of the nitro-nitrato alkane

The nitro-nitrato alkane is prepared by reacting an olefin, as hereafter defined, with nitrogen tetra-oxide under oxidizing conditions, e.g., in the presence of oxygen, at a temperature of from about 32° F. to about 175° F.; the nitrogen tetra-oxide and the oxygenating medium, e.g., oxygen, being introduced into the reaction mass at the rate of from about 1 to about 2 cubic feet per hour. The amount of nitrogen tetra-oxide employed is about 1 mol per mol of unsaturation in the olefin used. The nitration of the olefin is preferably conducted in an inert solvent, e.g., an alkyl hydrocarbon solvent, such as hexane.

Any olefin, containing at least ten carbon atoms, and at least one ethylenically unsaturated site, can be nitrated as above described. Mono- and poly-olefins can be suitably so nitrated to the corresponding nitro-nitrato alkane. Particularly suitable olefins are polymers of $C_2$ to $C_4$ mono-olefins containing at least 20 carbon atoms, preferably from about 30 to about 200, or more, carbon atoms, and molecular weights in the range of from about 300 to about 100,000. A particularly useful class of nitro-nitrato alkanes are those prepared from polypropenes and polybutenes having average molecular weights in the range of from about 300 to about 2,500.

(b) Preparation of alkane nitro-amine

The alkane nitro-amine is prepared by reacting from about 1 mol to about 4 mols of the nitro-nitrato alkane, obtained as above described, with each mol of an alkyl amine or an alkylene polyamine, in the presence of water, at a temperature of from about 100° F. to about 140° F., or in the presence of an organic non-reactive solvent at reflux temperature; and thereafter maintaining the reaction mass at such temperature for a period of about 3 to about 5 hours, with agitation. The resultant alkane nitro-amine is recovered by repeated washings of the reaction mass with, suitably, an aqueous sodium bicarbonate solution, followed by water washing.

The amine reactant can be any primary or secondary amine, the former being preferred. Illustrative of specific amines are: methylamine, dibutylamine, cyclohexylamine, dodecylamine, octyldecylamine, methyleneamines, ethylene amines, butylene amines, propylene amines, hexylene amines, ethylene diamine, triethylene tetramine, octylmethylene diamine, tetraethylene pentamine, and other polyalkylene amines wherein the alkylene groups contain suitably up to about 10 carbon atoms.

(c) Preparation of the alkane nitro-amine-organic polybasic acid derivative

The alkane nitro-amine, prepared as above described, is suitably diluted with an organic non-reactive polar solvent, or a mixture of such solvents, e.g., chlorinated hydrocarbon solvents, or other types such as dimethylformamide, the organic polybasic acid or anhydride slowly added to the diluted nitro-amine, and the mixture heated at reflux temperature for a time sufficient to complete the reaction, usually for a period of from about 1 hour to about 8 hours. Thereafter, the temperature of the reaction mass is increased sufficiently to distill or strip off the solvent. If desired, a nitrogen purge can be used to assist in the removal of the solvent.

Illustrative of organic polybasic acids or anhydrides are: succinic acid, succinic anhydride, adipic acid, adipic anhydride, phthalic acid, phthalic anhydride, terephthalic acid, trimellitic acid, trimellitic anhydride, etc.

PREFERRED EMBODIMENT

The following examples are illustrative of preferred embodiments of the present invention:

EXAMPLE A

Part 1.—1,720 grams of an isobutylene polymer, having an average molecular weight of about 890, was diluted with 1,000 cc. of hexane, and the solution treated simultaneously with $N_2O_4$ gas and oxygen, at rates of 1 cubic foot per hour, at a temperature in the range of 100–130° F. for a duration of 14.5 hours. The recovered product was a 90% nitro-nitrato polybutane.

Part 2.—To 1,000 grams of the nitro-nitrato polybutane, prepared as in Part 1, supra, 500 cc. of chloroform were added, and the diluted nitronitrato polybutane reacted with 180 grams of tetraethylene pentamine at room temperature. After the addition of the amine—over a period of one hour—the mixture was refluxed for 4 hours. About one-half of the chloroform was then stripped off, and replaced with dimethylformamide. Part 3. To the polybutane nitro-amine obtained in Part 2, supra, there were added 45 grams of trimellitic anhydride, and the mixture refluxed for 8 hours. The product was then heated to 300° F. to remove the chloroform, and the product then heated to 350° F. and purged with nitrogen to remove all of the solvent.

EXAMPLE B 1,000 grams of the polybutane nitro-amine prepared as in Parts 1 and 2 of Example A, supra, was reacted with 146 grams of adipic acid in chloroform at reflux temperature for a period of 8 hours. Thereafter the temperature was raised to distill off the chloroform.

EXAMPLE C

To a SAE 20 petroleum lubricating oil, containing 1.2% of a zinc dialkyl dithiophosphate, as an antioxidant, antiwear aditive, were added the following.

Sample 1: 2% (active concentration) of Example A
Sample 2: 2% (active concentrated) of Example B.

Samples 1 and 2 were tested in the Lincoln MSV Test Sequence to evaluate the low temperature dispersancy characteristics of the compounds of the present invention. Conditions for conducting the Lincoln MSV Test Sequence test, designed by the Ford Motor Company, are described in U.S. Pat. No. 3,442,808. At the conclusion of these tests the following results were obtained:

|  | Sludge rating |
|---|---|
| Sample 1 | 30 |
| Sample 2 | 30 |

The above results demonstrate that the organic polybasic acid or anhydride-alkane nitro-amine reaction products of the present invention exhibit excellent low temperature dispersancy in lubricating oils.

The herein-described compounds of the present invention are effective additives for use in hydrocarbon liquid fuels and in oleaginous lubricant compositions in amounts of from about 0.01% to about 10%; the amount used in fuel compositions usually ranges from about 0.01% to about 1.0%, and in lubricant compositions from about 0.1% to about 10%.

Suitable lubricating base oils are hydrocarbon oils, e.g., petroleum oils, synthetic lubricating oils such as those obtained by the polymerization of hydrocarbons, and other well-known synthetic lubricating oils.

Concentrates of a suitable oil base containing more than 10%, e.g., from about 15% to about 50% or more of the herein-described compounds of the present invention, can be used for blending with lubricating oils in proportions for particular conditions of use to give a finished product containing from about 0.1% to about 10% of the additive of the present invention.

Percentages given herein and in the appended claims are weight percentages unless otherwise stated.

While particular preferred embodiments of this invention have been described, it is to be understood that the invention is not limited thereto, but includes such modifications and variations as come within the spirit and scope of the appended claim.

I claim:

1. The oil-soluble product of the process consisting essentially of the steps of:
   (A) treating 1720 parts by weight of an isobutylene polymer having an average molecular weight of 890 in hexane solvent with nitrogen tetraoxide and oxygen to form the corresponding nitro-nitrato polybutane by simultaneously passing gaseous nitrogen tetraoxide and oxygen at rates of one cubic foot per hour per 1,720 grams of said polymer for a period of 14.5 hours into said solution being maintained at a temperature in the range of 100° to 130° F. and recovering said nitro-nitrato polybutane from solution;
   (B) reacting 1,000 parts by weight of the nitro-nitrato polybutane of step (A) with 180 parts by weight of tetraethylenepentamine in chloroform solvent under reflux conditions for a period of four hours to form the corresponding polybutane nitro amine condensation product of said tetraethylenepentamine and said nitro-nitrato polybutane;
   (C) reacting the condensation product of step (B) with 45 parts by weight of trimellitic anhydride in chloroform and dimethylformamide solvent under reflux conditions for a period of 8 hours; and
   (D) recovering said oil-soluble product by heating the reaction product solution of step (C) to a temperature in the range of 300 to 350° F. to remove solvent therefrom.

References Cited

UNITED STATES PATENTS 3,000,945  9/1961  Frankel _____ 260—583 F

ALEX MAZEL, Primary Examiner

B. DENTZ, Assistant Examiner

U.S. Cl. X.R.

252—51.5; 260—346.8, 475, 485